US010406966B2

(12) United States Patent
Kaatz

(10) Patent No.: US 10,406,966 B2
(45) Date of Patent: Sep. 10, 2019

(54) DEVICE FOR SECURING LOADS ON A LOADING SURFACE OF A VEHICLE

(71) Applicant: Ford Global Technologies, LLC, Dearborn, MI (US)

(72) Inventor: Sascha Kaatz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/864,298

(22) Filed: Jan. 8, 2018

(65) Prior Publication Data
US 2018/0229642 A1 Aug. 16, 2018

(30) Foreign Application Priority Data

Feb. 13, 2017 (DE) ........................ 10 2017 202 260

(51) Int. Cl.
*B60P 7/08* (2006.01)
*B60R 7/02* (2006.01)
*B60R 5/04* (2006.01)
*B60R 13/01* (2006.01)
*B60P 7/10* (2006.01)

(52) U.S. Cl.
CPC ............ *B60P 7/0892* (2013.01); *B60P 7/0807* (2013.01); *B60P 7/0853* (2013.01); *B60R 5/04* (2013.01); *B60R 7/02* (2013.01); *B60R 13/011* (2013.01); *B60P 7/10* (2013.01); *B60R 13/01* (2013.01); *B60R 2013/016* (2013.01)

(58) Field of Classification Search
CPC ............................. B60P 7/0892; B60P 7/0807

USPC .......................................................... 410/97
See application file for complete search history.

(56) References Cited

U.S. PATENT DOCUMENTS

| 2,621,807 | A | * | 12/1952 | Rendich | ............... | B23Q 16/001 |
| | | | | | | 211/50 |
| 4,027,892 | A | | 6/1977 | Parks | | |
| 4,222,695 | A | * | 9/1980 | Sarides | .................. | B60N 3/046 |
| | | | | | | 410/68 |
| 4,941,784 | A | * | 7/1990 | Flament | .................... | B60R 7/02 |
| | | | | | | 211/184 |
| 5,788,310 | A | | 8/1998 | McKee | | |
| 6,007,283 | A | * | 12/1999 | Labeur | .................... | B60R 21/06 |
| | | | | | | 410/100 |
| 6,183,177 | B1 | * | 2/2001 | Dahlgren | .............. | B60P 7/0876 |
| | | | | | | 410/100 |

(Continued)

FOREIGN PATENT DOCUMENTS

| DE | 1921376 U | 8/1965 |
| DE | 7414667 U | 10/1974 |

(Continued)

*Primary Examiner* — Hilary L Gutman
(74) *Attorney, Agent, or Firm* — Vichit Chea; Price Heneveld LLP

(57) ABSTRACT

A device for securing loads on a loading surface of a vehicle, comprising at least one floor plate retained on the loading surface and having recesses arranged to be distributed in a grid-like manner, rods or tubes which are able to be releasably fixed in the recesses and at least one limiting element which at two ends in each case comprises at least one fastener, the ends of the limiting element being able to be releasably fastened thereby to a free end of the rods or tubes. The at least one limiting element is configured as a flexible strap.

18 Claims, 8 Drawing Sheets

(56) References Cited

U.S. PATENT DOCUMENTS

| | | | | |
|---|---|---|---|---|
| 6,461,090 B1 * | 10/2002 | Faber | ................. | B60P 7/08 |
| | | | | 410/100 |
| 6,503,036 B1 * | 1/2003 | Bequette | ................. | B60P 3/40 |
| | | | | 410/121 |
| 6,702,532 B1 * | 3/2004 | Throener | ................. | B60P 7/0892 |
| | | | | 410/121 |
| 6,749,241 B1 * | 6/2004 | Erlandsson | ................. | B60R 7/005 |
| | | | | 296/24.4 |
| 6,890,138 B1 * | 5/2005 | Myrick | ................. | B60P 7/0892 |
| | | | | 410/94 |
| 7,137,764 B2 * | 11/2006 | Johnson | ................. | B60P 3/07 |
| | | | | 410/101 |
| 7,950,884 B2 * | 5/2011 | Thompson | ................. | B61D 45/006 |
| | | | | 410/118 |
| 10,166,928 B2 * | 1/2019 | Loew | ................. | B60R 7/02 |

FOREIGN PATENT DOCUMENTS

| | | | | |
|---|---|---|---|---|
| DE | 2443882 A1 | 4/1976 | | |
| DE | 2538394 A1 | 3/1977 | | |
| DE | 3618996 A1 | 12/1987 | | |
| DE | 3622018 A1 | 1/1988 | | |
| DE | 3806506 A1 | 10/1988 | | |
| DE | 4434286 C1 * | 3/1996 | ........... | B65D 25/106 |
| DE | 29711979 U1 | 11/1997 | | |
| DE | 19738130 A1 * | 3/1998 | ........... | B60P 7/0876 |
| DE | 20004483 U1 | 5/2000 | | |
| EP | 0869033 A2 | 10/1998 | | |
| EP | 1495913 A1 | 1/2005 | | |
| FR | 2467115 A1 * | 4/1981 | ............. | B60P 7/083 |
| GB | 2289449 A | 11/1995 | | |
| WO | 8800144 A1 | 1/1988 | | |
| WO | 00000366 A1 | 1/2000 | | |

* cited by examiner

DEVICE FOR SECURING LOADS ON A LOADING SURFACE OF A VEHICLE

FIELD OF THE INVENTION

The present invention generally relates to a device for securing loads on a loading surface of a vehicle, particularly for a motor vehicle.

BACKGROUND OF THE INVENTION

Vehicles, in particular motor vehicles, such as for example passenger motor vehicles, generally have a loading surface which is located in a loading area or luggage area, for example a trunk, which serves for stowing very different types of loads, for example objects such as bags, boxes or luggage and the like. In conventional motor vehicles there is the risk that the loads are secured only to a small extent or not at all to such a loading surface. This may result in the loads moving or tipping over in the loading area, whereby the loads may become damaged or the trunk lining may become soiled or damaged which may arise, in particular, in the case of a sudden braking or swerving maneuver or in the case of rapid cornering.

Insufficiently secured loads may also pose a risk for the vehicle occupants. For this reason there generally is a need for a device which is able to secure different types of loads on a loading surface of a vehicle.

Very different attempts have already been made in the past to solve this problem. For example, DE 36 22 018 A1 discloses a device for securing loads in motor vehicles, for example in the trunk of a passenger vehicle or on loading surfaces of trucks. The device has a floor plate which is retained on the loading surface and which has openings which are arranged so as to be distributed in a grid-like manner. Rods or tubes may be screwed into the openings in order to adapt to the contours of the loads to be secured, wherein the rods or tubes are then secured for absorbing lateral forces. Moreover, horizontal limiting strips or retaining strips are provided. The strips comprise loops or eyes attached at the ends thereof for pushing onto the free ends of the rods and being retained at a specific desired height by spacers which are able to be pushed onto the rods.

Similar devices for securing loads from slipping and/or tipping over in a loading area of a vehicle are disclosed in EP 1 495 913 A1 and WO 00/00366 A1. In this case, a base plate provided with holes is also arranged parallel to the floor of the loading area, wherein elongated fixing elements may be inserted into the holes. U.S. Pat. Nos. 5,788,310 and 4,027,892 also disclose very similar devices, wherein the device secures loads on a loading surface of a pickup truck.

DE 74 14 667 U further discloses a trunk floor insert for passenger motor vehicles, wherein the insert is intended to have the shape of the trunk floor and to be able to be inserted retrospectively into the trunk. Hooks or eyes are integrally formed on the insert, leashes or bungee cords being able to be fastened thereto on both sides of an item of luggage. The insert may also comprise holes, hooks of leashes or bungee cords being able to be hooked-in behind the edge thereof. Moreover, it is also provided that the insert has conical recesses, bars being able to be inserted therein in order to restrict the free space of the items of luggage as far as possible.

A device for securing loads in the loading area or trunk of a motor vehicle is disclosed in EP 0 869 033 A2, the device having a floor plate which is adapted to the peripheral dimensions of the respective loading area or trunk and which in turn comprises recesses which are distributed in a grid-like manner and in which bars or tubes are able to be inserted in a manner which is adapted to the contours of the loads to be secured.

Moreover, DE 10 921 376 U discloses a luggage holder for motor vehicles which has a luggage holder base which is produced from plastics or metal and which on the lower face is adapted to the trunk floor of the motor vehicle and on the upper face comprises holes arranged in a grid-like manner, fixing pins which may be configured for example as single pins, double pins, angled pins or cross pins, being able to be inserted therein.

WO 88/00144A1 also discloses a device for securing objects in a trunk of a motor vehicle, the device comprising a plate which is able to be laid on the floor of the trunk and which has uniformly distributed holes, pegs being able to be vertically inserted therein in order to secure the objects from slipping.

A floor mat provided with recesses or holes into which pins of, for example, vertical partitions may be inserted for laying on the floor of a loading area of a vehicle is disclosed in GB 2 289 449 A.

Moreover, a device for preventing the slipping and/or tipping over of loads when transported in a motor vehicle is disclosed in DE 297 11 979 U1, the device comprising a floor plate which is placed on a trunk floor or a loading surface of the motor vehicle and which is provided with uniformly arranged recesses for receiving load retaining elements and transport boxes. The differently designed retaining elements and transport boxes have on their lower faces projections which may be inserted into the recesses of the base plate.

DE 25 38 394 A1 and DE 24 43 882 A1 each disclose a device for securing objects on a support surface from movement parallel to the support surface, in which a mat made of an elastomeric or hard material with stud-like projections distributed in a grid-like manner is arranged on the support surface in a slip-resistant manner. Locking elements provided with recesses are able to be positioned onto the projections. The locking elements have a plate-shaped foot comprising the recesses and a retaining projection protruding at right angles therefrom.

DE 38 06 506 A1 discloses a wooden floor which is able to be rolled up as a floor covering for motor vehicles and trailers. The wooden floor consists of a plurality of wooden strips which are connected together by means of wire cables and which on their upper face comprise holes into which plug-in pins may be inserted in order to prevent the loads from slipping.

Moreover, a general device for the simple and rapid fastening and release of objects is disclosed in DE 36 18 996 A1 in which objects of any shape may be fixed by means of locking pins to a hole-matrix substrate. The hole-matrix substrate may consist of a flexible plastic in order to be adapted to uneven surfaces or from a strong solid material, for example, steel.

DE 200 04 483 U1 discloses a cupboard and drawer insert which consists of a perforated plate with positionable pegs, wherein the pegs are able to be screwed via a screw bolt connected thereto by rotating the peg by hand into any hole of the perforated plate.

In view of this background, it would be desirable to provide for a device for securing very different loads on a loading surface of a vehicle, which by a simple construction retains the loads securely and is able to be handled in a very simple, flexible and rapid manner, and when not in use the device is intended to require only a small amount of stowage space and further intended to have a low weight, to be able to be produced cost-effectively and to be washable.

SUMMARY OF THE INVENTION

According to one aspect of the present invention, a device for securing loads on a loading surface of a vehicle is provided. The device includes a floor plate retained on the loading surface and having recesses arranged in a grid-like manner, rods or tubes configured to be releasably fixed in the recesses, and at least one limiting element each configured as a flexible strap comprising at least one fastener at two ends to be releasably fastened to a free end of the rods or tubes.

According to another aspect of the present invention, a vehicle load securing device is provided. The vehicle load securing devices includes a floor plate retained on a vehicle loading surface and having recesses arranged in a grid-like manner, rods or tubes configured to be releasably fixed in the recesses, and a limiting element configured as a flexible strap comprising a fastener at each end to be releasably fastened to a free end of the rods or tubes.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
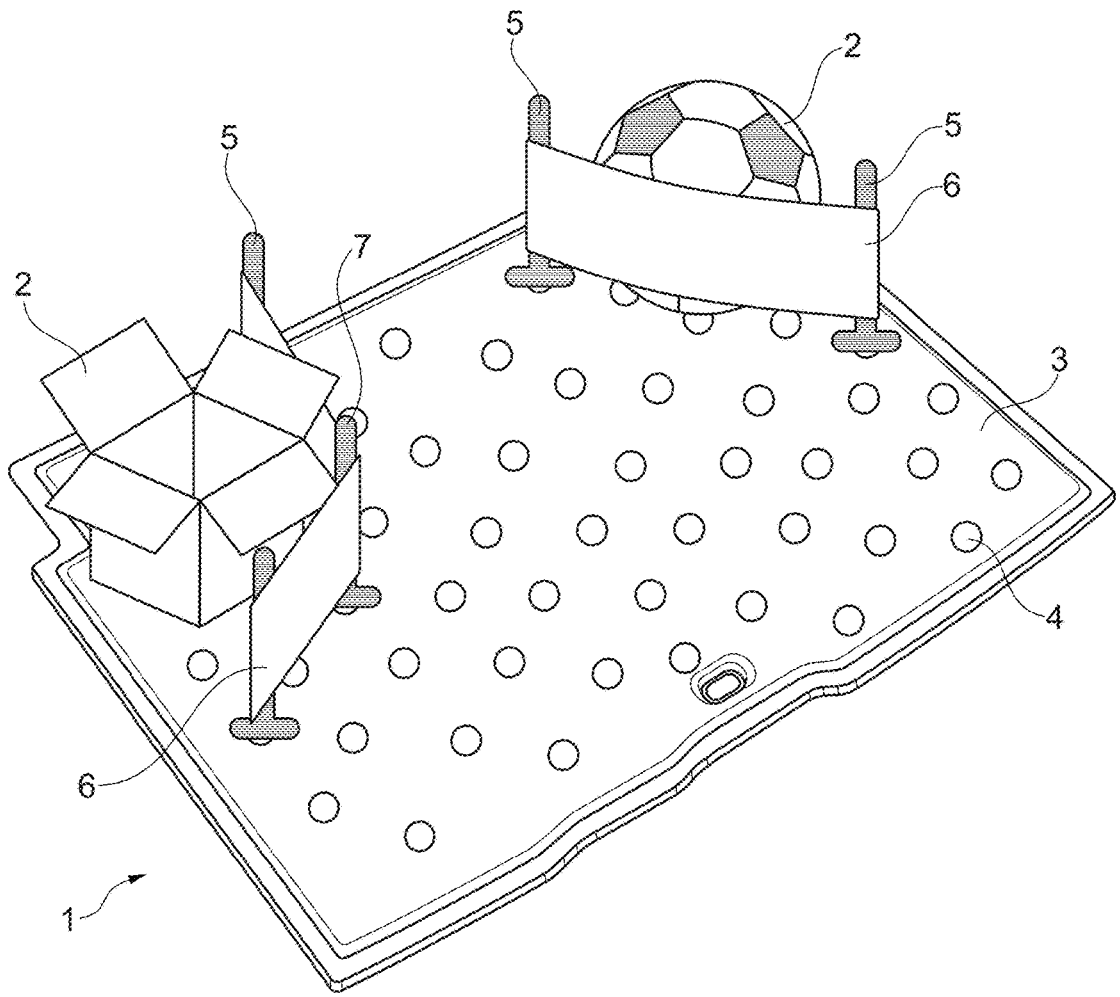
FIG. 1 is a perspective view of an exemplary embodiment of a device for securing loads on a loading surface of a vehicle.

In the various figures, parts which are the same with regard to their function are always provided with the same reference numerals, so that these parts are generally only described once.

FIG. 1 shows schematically a perspective view of an exemplary embodiment of a device 1 for securing loads 2 on a loading surface of a vehicle (not shown) according to one embodiment. The loads 2 in this exemplary embodiment are shown by way of example as cardboard boxes and/or boxes and a ball but naturally they may also be any other type of loads. As may be derived from FIG. 1, the device 1 comprises a substantially solid, rigid floor plate 3 which in the exemplary embodiment of the device 1 shown may be used as a trunk floor insert for a trunk (not shown) of the vehicle. To this end, the floor plate 3 is configured, in particular, in one piece and may be adapted to the peripheral dimensions of the loading area and/or trunk so that after insertion into the trunk of the vehicle the floor plate 3 is retained securely against slipping on the loading surface.

Moreover, it may be identified in FIG. 1 that the floor plate 3 comprises a plurality of recesses 4 which are arranged so as to be distributed in a grid-like manner, only one thereof being identified by way of example by the reference numeral 4 in FIG. 1. Moreover, the device 1 comprises a plurality of rods 5 which may also be configured as tubes. The rods 5 are releasably fixed in the respective recesses 4 of the floor plate 3, in particular inserted, clamped, screwed and/or latched therein.

The device 1 shown in FIG. 1 also comprises two flexible limiting elements 6 and/or flexible straps 6 which in each case are releasably fastened by their ends to the free ends of the rods 5 protruding from the floor plate 3. In the device 1 shown in FIG. 1 the straps 6 are produced from a resilient, in particular stretchable, material, for example elastane. For example, the stretching of the strap 6 when used for retaining a football as a load 2 is shown.

As may be identified further in FIG. 1, an intermediate rod 7 is inserted between the external rods 5 fastening the strap 6 of the partial area of the loading surface receiving the box, shown in the left-hand half of the image. The strap 6 is guided past this intermediate rod 7 only to the side at the free end of the intermediate rod 7, wherein, however, its direction of extent is altered, in particular deflected, as shown. In this manner, the limit and/or shape of the partial area of the loading surface limited by the strap 6 may be designed in a more flexible manner.

In FIG. 1 the surface side of the floor plate 3 which has the recesses 4 may be seen. The rear surface side of the floor plate 3 opposing this surface side, and not visible in FIG. 1, in the exemplary embodiment of the device 1 shown in FIG. 1 is entirely covered by a flat textile structure, preferably by a felt material. Thus, when the device 1 is not in use, the floor plate 3 may be advantageously placed in the trunk of the vehicle in an inverted manner relative to the view in FIG. 1 so that the recesses 4 of the floor plate 3 are not visible in this arranged state of the floor plate 3 in the trunk and a substantially more attractive visual impression may be provided.

Figure 2:
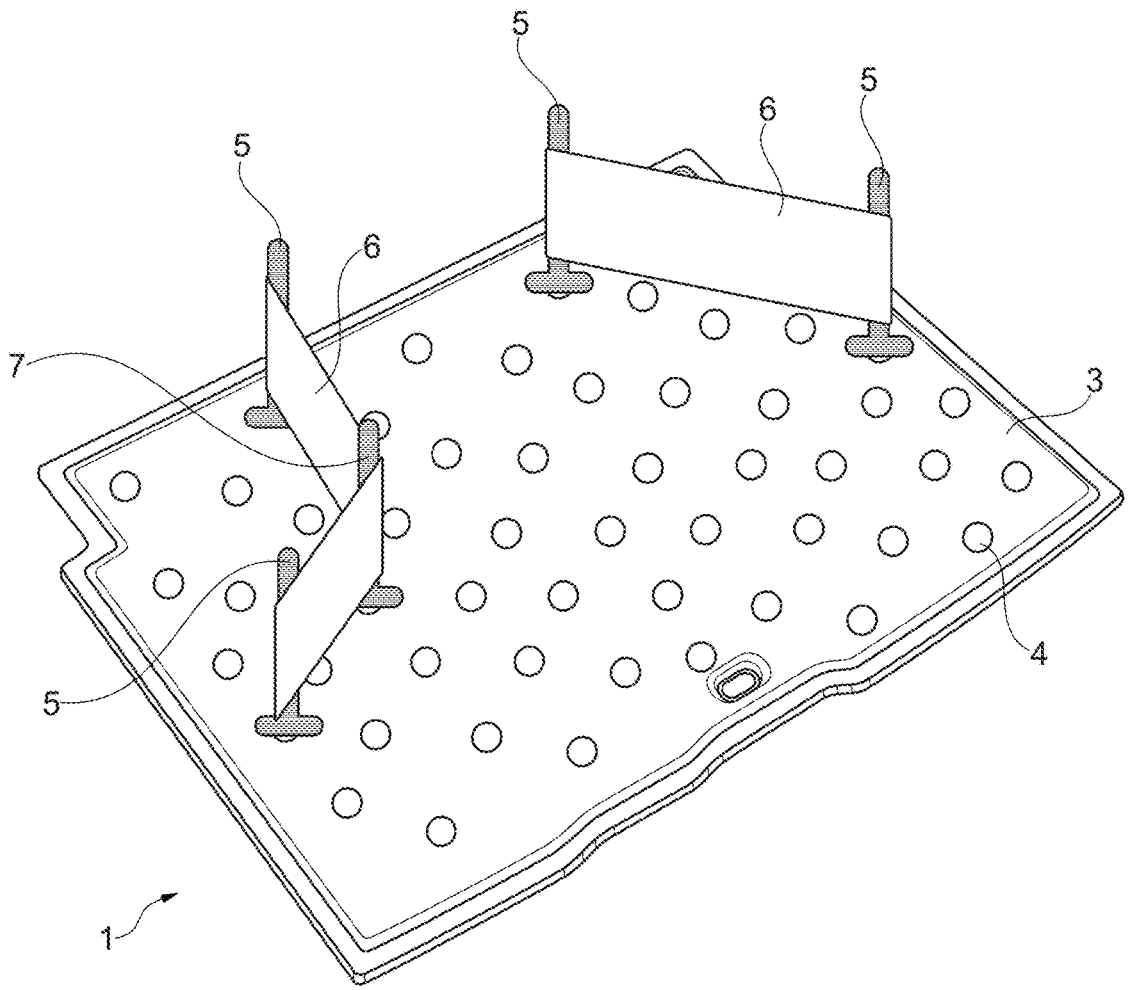
FIG. 2 is a perspective view further illustrating the device of FIG. 1.

FIG. 2 shows a further perspective view of the device 1 of FIG. 1 without loads 2. In this view it may be clearly identified that the strap 6 spanned between the two rods 5 in the right-hand half of the image substantially extends in a straight line of extension between the rods 5, whereas the strap 6 shown in the left-hand half of the image is deflected by the intermediate rod 7 in its path from the one outer rod 5 to the other outer rod 5. The strap 6, which is shown in FIG. 1 in the form stretched by the loads 2, is shown here in the right-hand half of the image without the stretching caused by the loads.

Figure 3:
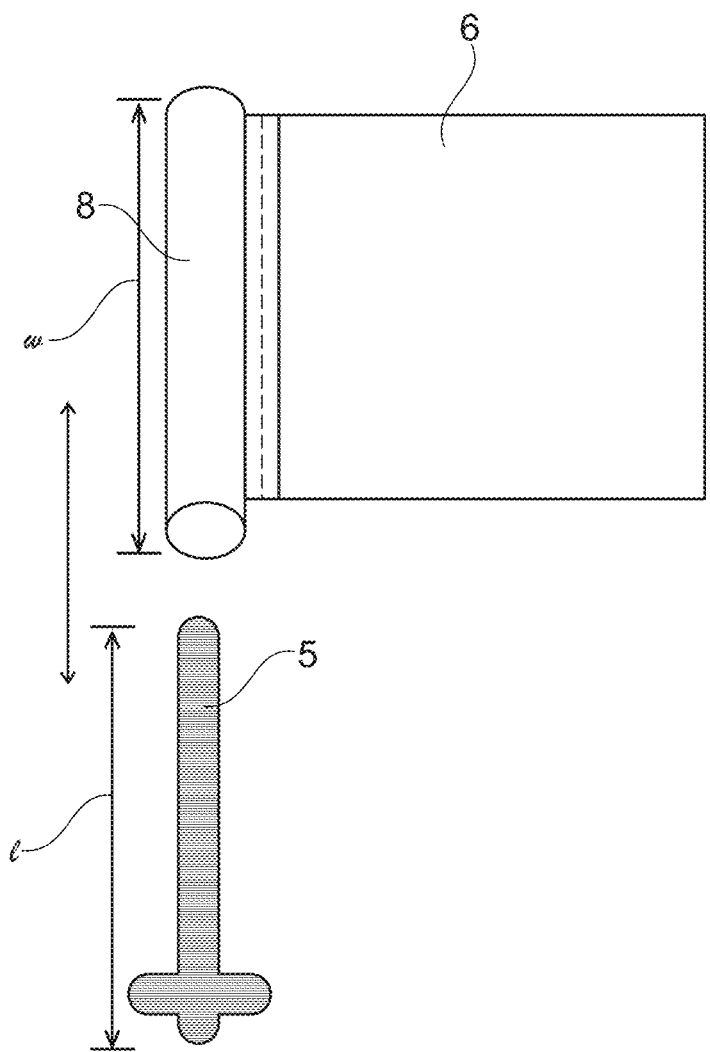
FIG. 3 is a side view of a rod and of a limiting element of the device of FIG. 1.

FIG. 3 shows a side view of a rod 5 and a limiting element 6 and/or strap 6 of the device of FIG. 1 in a state separated from one another. Only half of the strap 6 is shown in FIG. 3, wherein the left-hand end of the strap 6 may be seen in FIG. 3. As may be derived from FIG. 3, the strap 6 has a fastener in the form of a loop 8 attached to its end which is shown, by means of which the end of the strap 6 is able to be releasably fastened to the free end of the rod 5, in particular in this case is able to be pushed onto the free end of the rod 5. This represents a positive connection between the strap 6 and the rod 5 which is able to be handled in a particularly simple and rapid manner but is nevertheless secure relative to the tensioning direction of the strap 6 between two rods 5.

Figure 4:
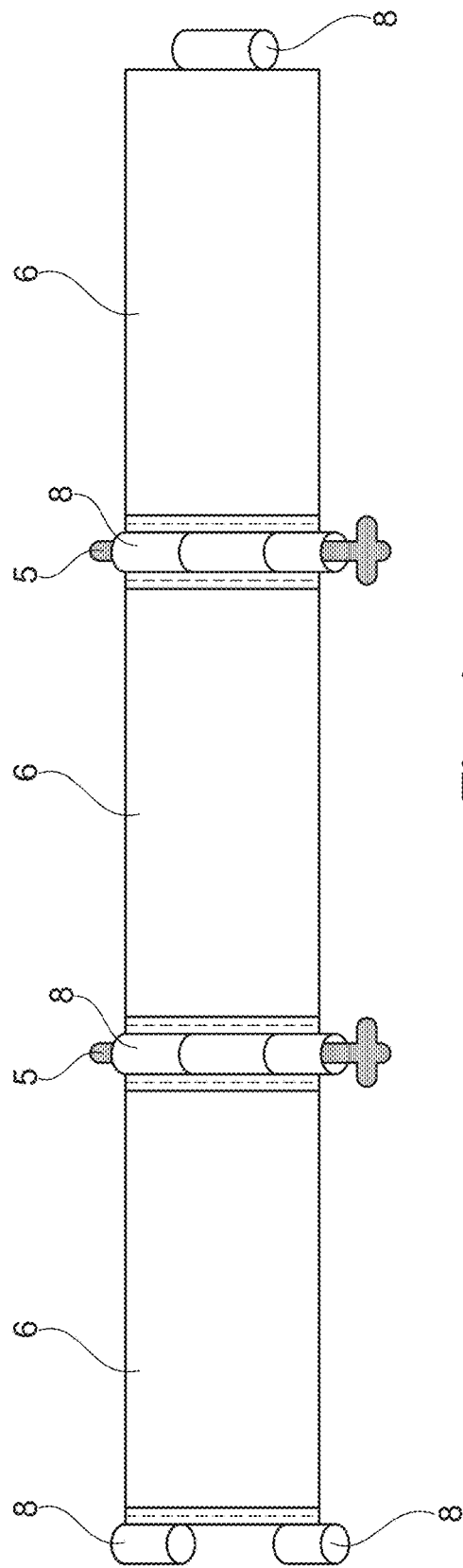
FIG. 4 is a side view of a plurality of limiting elements closed up to form a chain.

FIG. 4 shows a side view of a plurality of limiting elements 6 and/or straps 6 closed up to form a chain. As may be identified in FIG. 4, to this end a strap 6 at both of its ends in each case comprises fastener 8 in the form of loops 8, wherein however at the right-hand end of each strap 6 shown in FIG. 4, a loop 8 is arranged substantially in the middle of the width direction of the strap 6, and at the respective left-hand end of each strap 6 two loops 8 are arranged adjacent to the outer edges of the strap 6, so that the centrally arranged loop of the one end of a strap 6 may be arranged between the two loops 8 arranged on the edge of the other end of a further strap 6, when said loops are pushed onto the free end of the rod 5. Thus any number of a plurality of straps 6 may be arranged in series by means of the rods 5. Also both ends of a strap 2 could be pushed onto the same rod 5. A partial area could then be spanned by means of intermediate rods 7.

Figure 5:
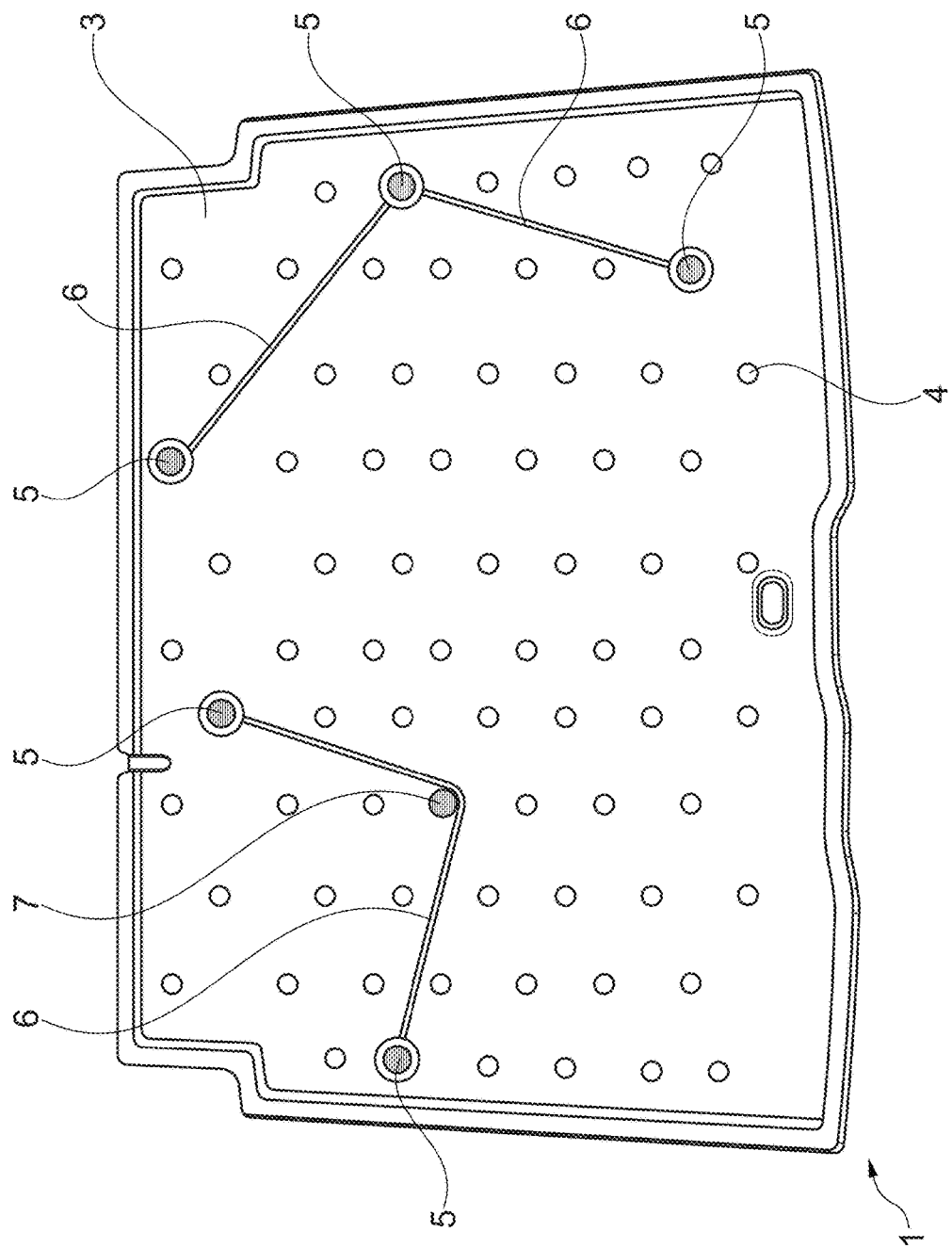
FIG. 5 is a plan view of the device of FIG. 1 with a first exemplary subdivision of the loading surface into different partial areas.

FIG. 5 shows a plan view of the device 1 of FIG. 1 with a first exemplary subdivision of the loading surface into different partial areas. In the left-hand half of the image, the strap 6 is fastened to two outer rods 5 and deflected by an intermediate rod 7. In the right-hand half of the image, two individual straps 6 are fastened to a total of three rods 5, wherein two straps 6 are fastened to the central rod 5 in the manner shown in FIG. 4.

Figure 6:
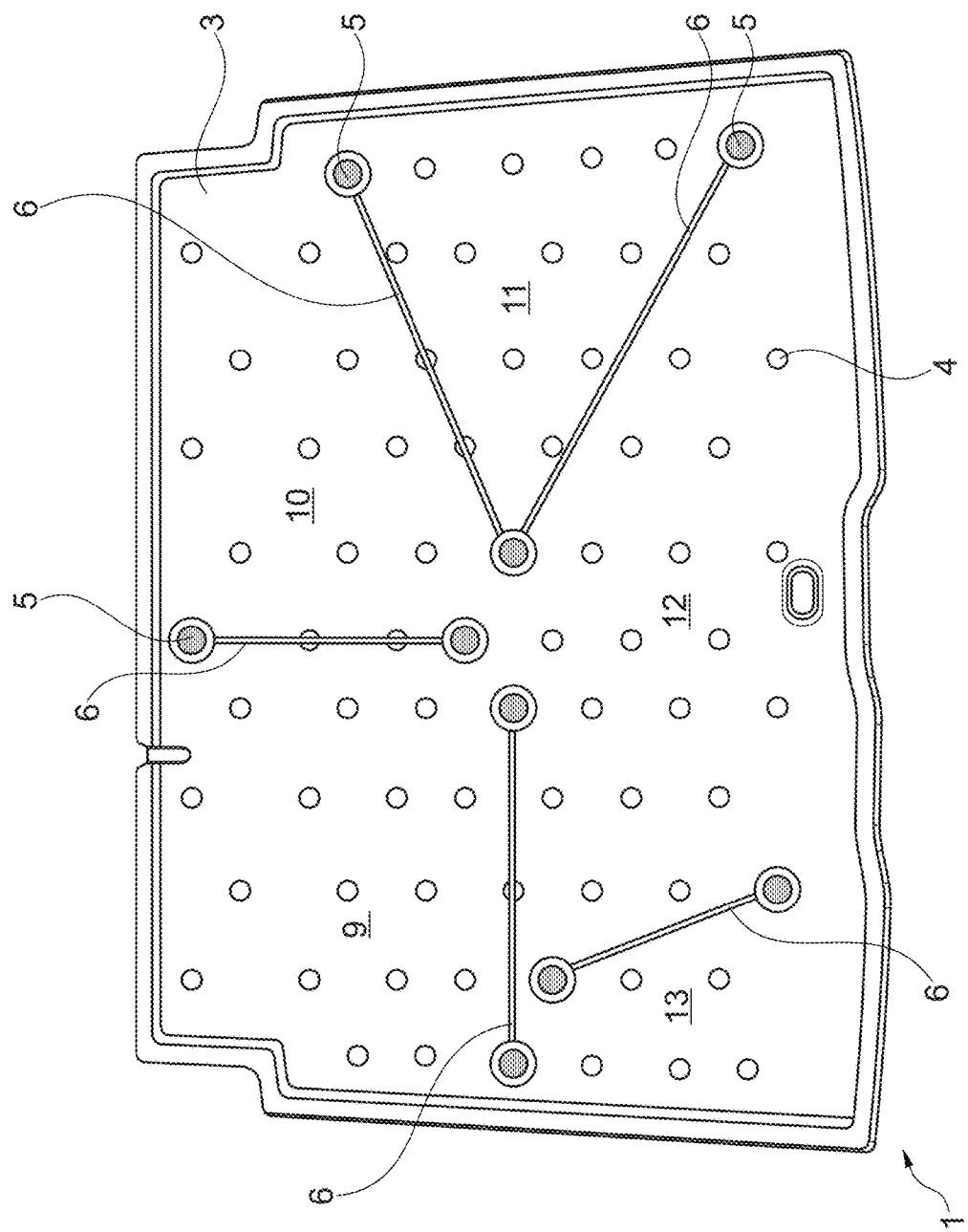
FIG. 6 is a plan view of the device of FIG. 1 with a second exemplary subdivision of the loading surface into different partial areas.

FIG. 6 shows a plan view of the device 1 of FIG. 1 with a second exemplary subdivision of the loading surface into different partial areas 9, 10, 11, 12 and 13. As may be identified, the limit of the partial area 11 is formed by two individual straps 6 and a total of three rods 5, wherein the two straps 6 are fastened to the central rod 5 once again according to the manner shown in FIG. 4. All other partial areas 9, 10, 12 and 13 are secured in each case by a single strap 6 spanned between two rods 5.

Figure 7:
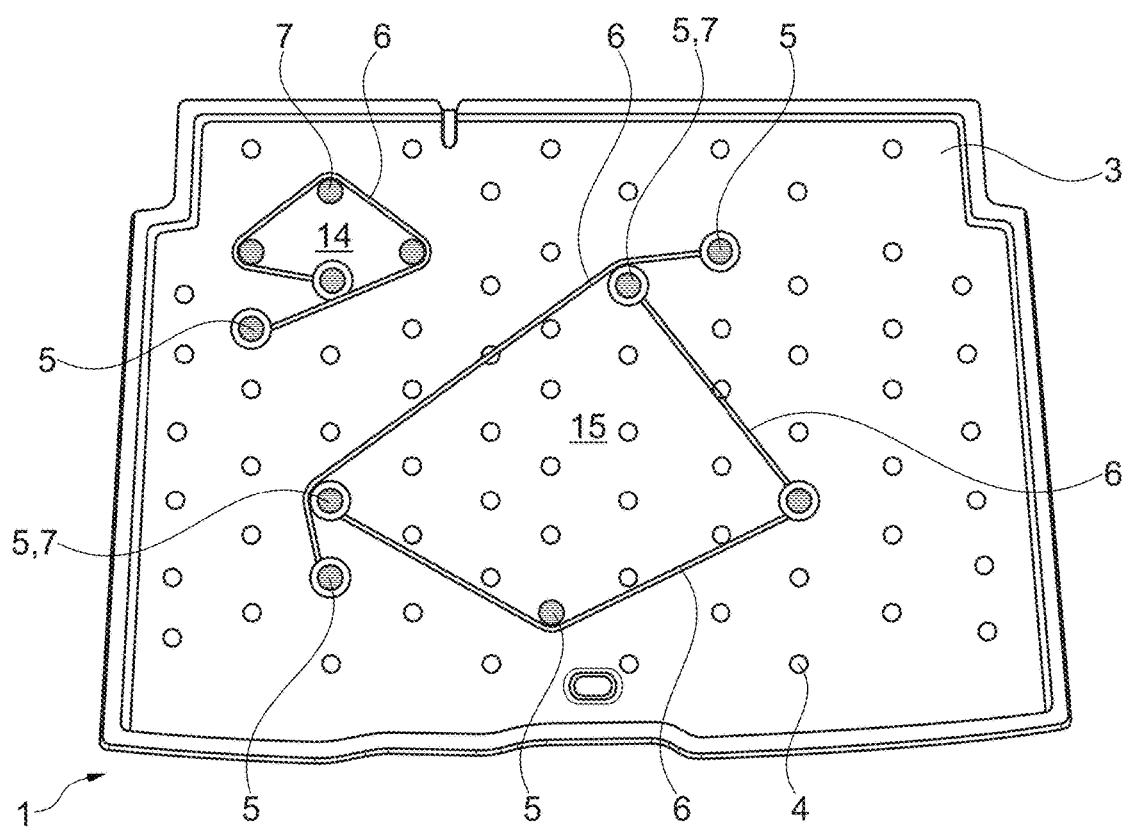
FIG. 7 is a plan view of the device of FIG. 1 with a third exemplary subdivision of the loading surface into different partial areas.

FIG. 7 shows a plan view of the device 1 of FIG. 1 with a third exemplary subdivision of the loading surface into different partial areas 14 and 15. In this case, the partial area 14 is formed by just one strap 6 which is fastened to two rods 5 on the end side and is deflected at three intermediate rods 7. The partial area 15 is formed by a total of three individual straps 6. A first strap 6 limiting the partial area 15 on the right-hand side is spanned between an upper first rod and a lower second rod 5. A second strap 6 limiting the partial area 15 on the lower face is spanned between the second rod 5 fastening the lower end of the right-hand first strap 6, according to the manner shown in FIG. 4, and a further third rod 5 and deflected by an intermediate rod 7. The third strap 6 limiting the partial area 15 on the upper face is spanned between two further fourth and fifth rods 5, wherein the first and third rods 5 at the same time function as intermediate rods 7 for deflecting the path of the third strap 6 on the upper face. Thus partial areas may be formed in a central region of the loading surface in which the potentially fragile load 2 may simply be retained by the flexible straps 6 and without contact with potentially hard surroundings.

Figure 8:
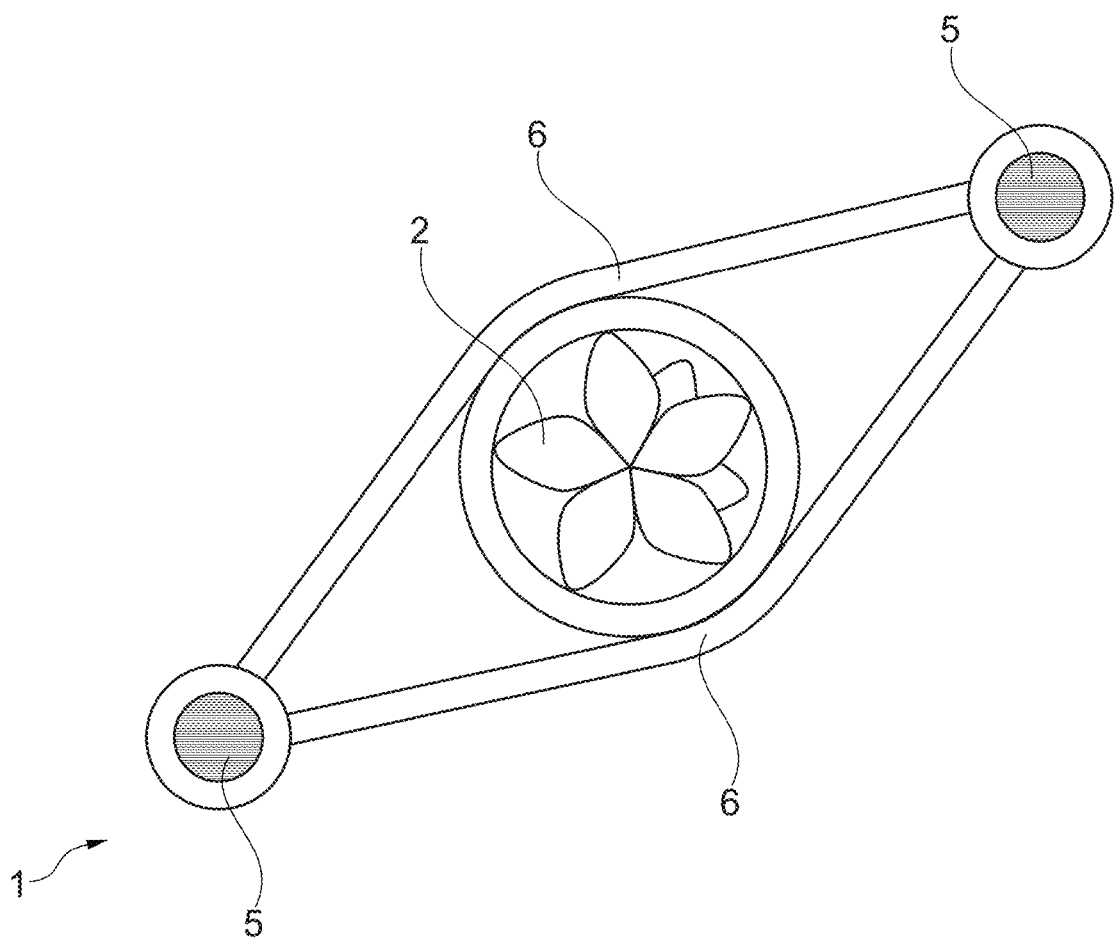
FIG. 8 is a plan view of two rods and two straps for retaining a load on the device.

FIG. 8 shows a plan view of an exemplary arrangement of two rods 5 and two straps 6 for retaining fragile loads 2. In this case the loads 2 are retained by the stretching of the straps 6.

The device 1 which is described above for securing loads on a loading surface of a vehicle, in particular a motor vehicle, is not limited to the embodiment disclosed herein but also encompasses further embodiments having the same function. Thus the limiting elements and/or straps, for example, may also be clamped by their ends to the respective free end of the rods or tubes by means of correspondingly configured clamping means. Moreover, the free ends of the rods or tubes could also be divided by a slot extending along the entire free end, so that in each case a limiting element and/or strap could be fastened to a half of the rod or the tube, for example could be pushed onto each half of the rod or the tube by means of a loop or eye attached to the respective end of the limiting element and/or strap. In this manner, the fastening of two limiting elements and/or straps to only one rod or one tube is conceivable.

In one exemplary embodiment, the device 1 may be used for securing loads on a loading surface, in particular on a loading surface in a trunk of a motor vehicle.

It should be mentioned that the features set forth individually in the following description may be combined together in any technically expedient manner and disclose further embodiments of the invention. The description characterizes and specifies the invention, in particular additionally in combination with the figures.

According to one embodiment, a device for securing loads on a loading surface of a vehicle, for example on the loading surface of a trunk of a motor vehicle, comprises at least one floor plate which is retained on the loading surface, the floor plate having recesses which are arranged so as to be distributed in a grid-like manner. "Retained on the loading surface" does not necessarily mean that the floor plate is fixedly connected to the loading surface but the floor plate may also bear loosely against the loading surface and only be prevented by its shape or even by other means, such as for example an anti-slip mat, from slipping. Moreover, the device comprises rods or tubes which are able to be releasably fixed in the recesses of the floor plate and at least one limiting element which at two ends in each case comprises at least one fastener, the ends of the limiting element being able to be releasably fastened to a free end of the rods or tubes. According to one embodiment, the limiting element is configured as a flexible strap.

The device thus permits an extremely flexible insert on the loading surface of the vehicle for forming almost any shaped partial areas on the loading surface, in which loads of very different shapes may be securely retained against slipping and/or tipping over substantially by means of the limiting elements and/or straps spanned between the rods or tubes. The shape of the partial areas may, in particular, be designed in any manner, such that one or more further rods or tubes may be fixed to the floor plate between two rods or tubes, the limiting element and/or strap being fastened thereto by the ends thereof, wherein the flexible limiting element and/or strap only bears at the side against the free end of each intermediate rod or each intermediate tube and is guided past the free end whereby, however, its direction of extent may be altered and/or deflected. Moreover, the arrangement and/or positioning and the number of partial areas on the loading surface may be fixed in any manner.

The partial areas may be formed in almost any size and number on the loading surface, wherein the size of the partial areas substantially depends only on the length of the limiting elements and/or straps, and the number of partial areas able to be created depends only on the number of rods and/or tubes and limiting elements and/or straps available. The construction of the partial areas is able to be carried out in a simple and rapid manner since to this end the rods or tubes only have to be fixed in the respective recesses of the floor plate and the limiting elements and/or straps are fastened by their ends to the free ends of the rods or tubes by means of the fastener.

Since the limiting elements and/or straps are flexible, they may be folded up in a space-saving manner when the device is not used, so that only a small stowage space is required for stowing the device when not in use. For stowing the rods or tubes and the limiting elements and/or straps, a storage compartment may be provided on the loading surface and/or in the loading area of the vehicle or on the floor plate itself.

Moreover, the device as a whole has a low weight, in particular due to the limiting elements and/or straps having only a low weight. The limiting elements and/or straps are also washable, so that they may be easily cleaned after the transport of soiled loads.

The rods or tubes are preferably produced from a stiff, relatively hard material, for example plastics, wood or metal in order to ensure a correct and a secure retention of the limiting elements and/or straps on the floor plate and thus in order to retain the loads securely against slipping and/or tipping over on the loading surface.

In a preferred advantageous embodiment, the limiting element and/or strap is stretchable. For example, it may be produced from a resilient material such as elastane. As a result, an even greater flexibility is possible when forming the subdivisions of the loading surface into a plurality of partial areas.

According to a further advantageous embodiment, two limiting elements and/or straps are able to be fastened in each case by one of their two ends to the free end of a rod or a tube. In this manner, a plurality of limiting elements and/or straps may be connected to form a chain, so that an even greater flexibility is provided when forming the subdivisions of the loading surface into a plurality of partial areas, by longer limiting walls formed by the limiting elements and/or straps.

A further advantageous embodiment provides that the fastener is a loop or eye which is able to be pushed onto the free end of the rods or tubes and which thus provides a secure positive connection between the rod or the tube and the end of the limiting element and/or strap. As a result, additionally a particularly simple and rapid assembly of the device on the loading surface of the vehicle is possible.

For obtaining an even greater flexibility when forming the subdivisions of the loading surface into a plurality of partial areas, in an even further advantageous embodiment at least two limiting elements and/or straps of variable length may be provided. The width of the limiting elements and/or straps preferably substantially corresponds to the length of the free ends of the rods or tubes so that in the assembled state of the device the limiting elements and/or straps reach as far as the surface side of the floor plate, from which the rods or tubes substantially protrude at right angles after having been fixed to the floor plate. The limiting elements and/or straps, however, may also have a smaller width.

For an assembly of the device which is able to be carried out in a simple, rapid and, in particular manual, manner on the loading surface of the vehicle, an even further advantageous embodiment provides that the rods or tubes are able to be inserted, clamped, screwed and/or latched into the recesses of the floor plate. As a result, a sufficiently fixed securing of the rods or tubes to the floor plate is ensured and this, however, also permits a rapid repositioning of the rods or tubes, for example when forming the partial areas and/or the subdivisions of the loading surface.

According to a further advantageous embodiment, a surface side of the floor plate is entirely covered by a flat textile structure, for example felt. In other words, the recesses in the floor plate, as they are intended to penetrate the floor plate, are also entirely covered on this surface side. Thus, when the device is not used, the floor plate may be arranged on the loading surface of the vehicle in an inverted state, whereby the visual appearance of the loading surface, in particular for example a loading surface in a trunk of the vehicle, is substantially improved.

According to a further preferred embodiment, the floor plate is configured in one piece and is adapted to the peripheral dimensions of the loading area. In this manner, the floor plate is secured in a particularly simple manner against slipping on the loading surface.

According to an even further advantageous embodiment, the loading area is a trunk of the vehicle, the floor plate being able to be inserted therein as a trunk floor insert.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A device for securing loads on a loading surface of a vehicle, comprising:
   a floor plate retained on the loading surface and having recesses arranged in a grid-like manner;
   rods or tubes configured to be releasably fixed in the recesses; and
   first and second limiting elements, each of the first and second limiting element configured as a flexible strap comprising one loop fastener positioned at a center portion of a first end and two loop fasteners positioned proximate to outer edges of a second end, wherein the first end of the first limiting element and the second end of the second limiting elements are releasably fastened to a free end of a single rod or tube with the one loop fastener of the first end positioned between the two loop fasteners of the second end.

2. The device as claimed in claim 1, wherein the strap is stretchable.

3. The device as claimed in claim 1, wherein the fastener comprises an eye configured to be pushed onto the free end of the rods or tubes.

4. The device as claimed in claim 1, wherein at least two straps of variable length are provided.

5. The device as claimed in claim 1, wherein the rods or tubes are able to be inserted, clamped, screwed and/or latched into the recesses.

6. The device as claimed in claim 1, wherein a surface side of the floor plate is entirely covered by a flat textile structure.

7. The device as claimed in claim 1, wherein the floor plate is configured in one piece and is adapted to the peripheral dimensions of the loading area.

8. The device as claimed in claim 1, wherein the loading area is a trunk of the vehicle, the floor plate being able to be inserted therein as a trunk floor insert.

9. A vehicle load securing device, comprising:
   a floor plate retained on a vehicle loading surface and having recesses arranged in a grid-like manner;
   rods or tubes configured to be releasably fixed in the recesses; and
   a first and second limiting element, each configured as a flexible strap comprising a one fastener at a first end and two fasteners at a second end at each end to be releasably fastened to a free end of the rods or tubes, wherein the one fastener of the first end of the first limiting element is disposed between the two fasteners of the second end of the second limiting element when releasably fastened to a single rod or tube, and further wherein a width of the limiting element corresponds to a height length of the free end of the rods or tubes.

10. The device as claimed in claim 9, wherein the strap is stretchable.

11. The device as claimed in claim 9, wherein two straps are able to be fastened by one of two ends to the free end of a rod or a tube.

12. The device as claimed in claim 9, wherein the fastener comprises a loop or eye configured to be pushed onto the free end of the rods or tubes.

13. The device as claimed in claim 9, wherein at least two straps of variable length are provided.

14. The device as claimed in claim 9, wherein the rods or tubes are able to be inserted, clamped, screwed and/or latched into the recesses.

15. The device as claimed in claim 9, wherein a surface side of the floor plate is entirely covered by a flat textile structure.

16. The device as claimed in claim 9, wherein the floor plate is configured in one piece and is adapted to the peripheral dimensions of the loading area.

17. The device as claimed in claim 9, wherein the loading area is a vehicle trunk, the floor plate being able to be inserted therein as a trunk floor insert.

18. The device as claimed in claim 9, wherein the rods or tubes each define protrusions configured to abut a top surface side of the floor plate.

* * * * *